(12) United States Patent
Yin et al.

(10) Patent No.: US 11,021,772 B2
(45) Date of Patent: Jun. 1, 2021

(54) METHOD AND DEVICE FOR REMOVING IRON IN IRON-CONTAINING SOLUTION IN HYDROMETALLURGY

(71) Applicant: CHINA ENFI ENGINEERING CORPORATION, Beijing (CN)

(72) Inventors: Shuyan Yin, Beijing (CN); Yeda Lu, Beijing (CN); Pengfei Zhao, Beijing (CN); Jianguo Fu, Beijing (CN); Shaolong Li, Beijing (CN); Bin Li, Beijing (CN); Mingxiao Qin, Beijing (CN)

(73) Assignee: CHINA ENFI ENGINEERING CORPORATION, Beijing (CN)

( * ) Notice: Subject to any disclaimer, the term of this patent is extended or adjusted under 35 U.S.C. 154(b) by 0 days.

(21) Appl. No.: 15/769,753

(22) PCT Filed: Nov. 13, 2017

(86) PCT No.: PCT/CN2017/110690
§ 371 (c)(1),
(2) Date: Apr. 20, 2018

(87) PCT Pub. No.: WO2019/090759
PCT Pub. Date: May 16, 2019

(65) Prior Publication Data
US 2020/0263273 A1 Aug. 20, 2020

(51) Int. Cl.
*C22B 3/44* (2006.01)
*C22B 3/02* (2006.01)
(Continued)

(52) U.S. Cl.
CPC ............. *C22B 3/44* (2013.01); *B01J 19/0066* (2013.01); *B01J 19/1862* (2013.01); *C22B 3/02* (2013.01); *C22B 3/22* (2013.01)

(58) Field of Classification Search
CPC ..... C22B 3/02; C22B 3/22; C22B 3/44; B01J 19/0066; B01J 19/1862
(Continued)

(56) References Cited

U.S. PATENT DOCUMENTS 3,652,264 A * 3/1972 Bodson .................... C01G 9/06
423/104
4,100,251 A * 7/1978 Reinhardt ............... C22B 34/22
423/63
(Continued)

FOREIGN PATENT DOCUMENTS

CN 103194602 A 7/2013
CN 103290214 A 9/2013
(Continued)

*Primary Examiner* — Melissa S Swain
(74) *Attorney, Agent, or Firm* — Gang Yu

(57) ABSTRACT

The present disclosure discloses a method and device for removing iron in an iron-containing solution in hydrometallurgy. This method comprises the steps of: adding an iron-containing solution in hydrometallurgy into a reactor through a first homogenizing distributor, controlling concentration of the ferric iron in the reactor below 1 g/L, controlling pH of the solution in the reactor to be 2.5~4, the temperature to be 65~100° C., and the reaction duration to be 1~3 hours, performing solid-liquid separation for the solution after reaction, and removing the iron in the iron-containing solution in hydrometallurgy in the form of goethite.

4 Claims, 1 Drawing Sheet

(51) Int. Cl.
  *B01J 19/00* (2006.01)
  *B01J 19/18* (2006.01)
  *C22B 3/22* (2006.01)
(58) Field of Classification Search
  USPC .......................................................... 423/139
  See application file for complete search history.

(56) References Cited

U.S. PATENT DOCUMENTS

| | | | | |
|---|---|---|---|---|
| 4,330,379 | A | * | 5/1982 | Verbaan .................. C22B 19/22 |
| | | | | 205/608 |
| 2006/0291827 | A1 | * | 12/2006 | Suib ....................... B01J 35/002 |
| | | | | 392/401 |
| 2017/0320763 | A1 | * | 11/2017 | Noland ..................... B09C 1/10 |

FOREIGN PATENT DOCUMENTS

| | | | |
|---|---|---|---|
| CN | 103740931 | A | 4/2014 |
| CN | 106566926 | A | 4/2017 |
| CN | 107858509 | A | 3/2018 |
| CN | 108060303 | A | 5/2018 |

\* cited by examiner

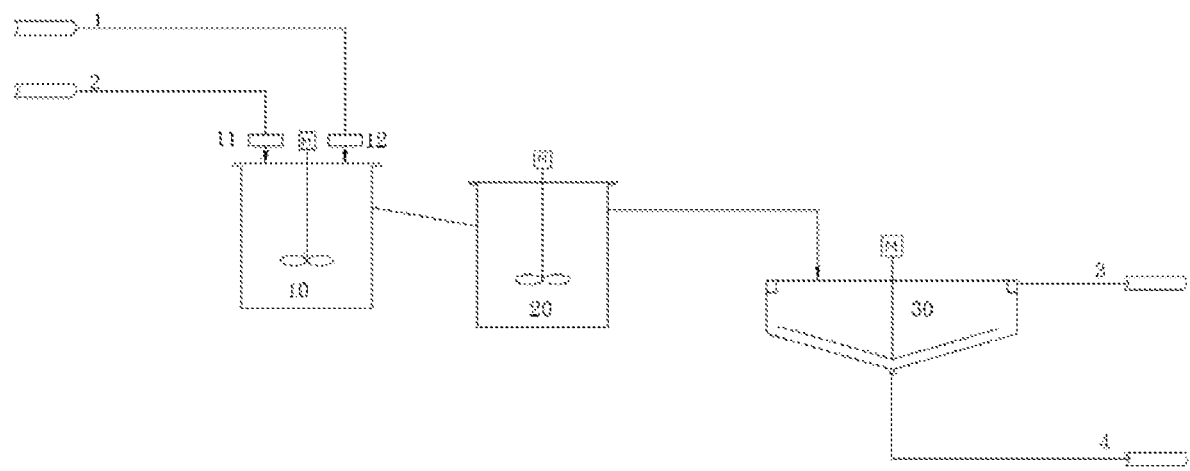

METHOD AND DEVICE FOR REMOVING IRON IN IRON-CONTAINING SOLUTION IN HYDROMETALLURGY

TECHNICAL FIELD

The present disclosure relates to the technical field of metal smelting, and in particular a method and device for removing iron in an iron-containing solution in hydrometallurgy.

BACKGROUND

Iron is usually an impurity element in hydrometallurgical process and needs to be removed. When iron in solution is ferric, the method of direct neutralization for hydrolytic precipitation is mainly used at present, but in this method, the main product is iron hydroxide, taking a colloidal form, and solid-liquid separation is difficult to carry out; if precipitation is performed using a thickener, the underflow concentration is usually less than 20%, and the underflow ore pulp will take away a lot of water to entail further treatment. Or as stated in the patents CN 102010994A and CN 103468951A, a reducing agent is added first to reduce ferric iron to ferrous iron, then oxygen or hydrogen peroxide solution is introduced as an oxidizing agent to slowly oxidize ferrous iron into ferric iron, and then a neutralizer is added to form goethite in the form of precipitation, thereby changing the sedimentation and filtering performances of the slag. However, in this method, a large amount of reducing agents and oxidizing agents are consumed, and meantime reducing slag is generated.

SUMMARY

The present disclosure aims to provide a method and device for removing iron in an iron-containing solution in hydrometallurgy to solve the technical problem of entailing consumption of lots of reducing agents and oxidants in the art.

In order to achieve the above objective, in accordance with an aspect of the present disclosure, a method for removing iron in an iron-containing solution in hydrometallurgy is provided. This method comprises the steps of: adding an iron-containing solution in hydrometallurgy into a reactor through a first homogenizing distributor, controlling concentration of the ferric iron in the reactor below 1 g/L, controlling pH of the solution in the reactor to be 2.5~4, the temperature to be 65~100° C., and the reaction duration to be 1~3 hours, performing solid-liquid separation for the solution after reaction, and removing the iron in the iron-containing solution in hydrometallurgy in the form of goethite.

Further, controlling pH of the solution in the reactor to be 2.5~4 is achieved by adding neutralizer to the reactor through a second homogenizing distributor.

Further, the neutralizer is one or more selected from a group consisting of limestone, lime, magnesium oxide, zinc oxide and sodium hydroxide.

Further, the first homogenizing distributor is a uniform dispersing device.

Further, the reactor is a reactor with stirring function.

Further, when the iron-containing solution in hydrometallurgy contains ferrous iron, oxidant is added to the reactor to oxidize ferrous iron to ferric iron; when the iron-containing solution in hydrometallurgy does not contain ferrous iron, it is unnecessary to add oxidant to the reactor.

Further, the oxidant is air or oxygen.

Further, a plurality of reactors are provided, and automatic-flow connection exists between the plurality of reactors.

In accordance with a further aspect of the present disclosure, a device for removing iron in an iron-containing solution in hydrometallurgy is provided. The device comprises: a first homogenizing distributor for adding the iron-containing solution in hydrometallurgy into the reactor; a reactor for reacting the iron in the iron-containing solution in hydrometallurgy to generate goethite; and a thickener for removing the goethite generated in the reactor through solid liquid separation.

Further, the device further comprises a second homogenizing distributor for adding neutralizer to the reactor.

Further, the first homogenizing distributor is a uniform dispersing device.

Further, the reactor is a reactor with stirring function.

Further, a plurality of reactors are provided, and automatic-flow connection exists between the plurality of reactors.

In the technical solution of the present disclosure, adding the iron-containing solution in hydrometallurgy into the reactor through a homogenizing distributor can directly convert the ferric iron in the solution to goethite precipitation, without a need to conduct ferric iron-ferrous iron-ferric iron conversion by adding lots of reducing agents and oxidizers as it does in the prior art, and without a need to return the seed crystal, which saves operation costs; in this method, solid-liquid separation is easy for the precipitation, the underflow concentration of the thickener can reach above 35%, which reduces entrainment of valuable metals in the underflow ore pulp, and improves the recovery rate of valuable metals except iron.

BRIEF DESCRIPTION OF THE DRAWINGS

For a better understanding of the present disclosure, accompanying drawings described hereinafter are provided to constitute one part of the application; the schematic embodiments of the present disclosure and the description thereof are used to illustrate the present disclosure but to limit the present disclosure improperly. In the accompanying drawings:

FIG. 1 is a schematic diagram of a device structure and a process for removing iron in an iron-containing solution in hydrometallurgy according to a typical embodiment of the present disclosure.

DETAILED DESCRIPTION OF THE EMBODIMENTS

The present disclosure will be described below with reference to the drawing and in conjunction with embodiments. It should be noted that the embodiments in this application and the characteristics of the embodiments can be combined with each other if no conflict is caused.

The principle of removing iron in the goethite method is to control the pH to be 2.5~4, the temperature to be 65~100° C., and the concentration of ferric iron in the solution to be below 1 g/L, and how to control the concentration of ferric iron in the solution is the key. In the prior art, the main purpose of the process of first reduction and then slow oxidation is to control the iron content in the solution at a low level. In the present disclosure, the process of reduction and then oxidation is canceled to decrease consumption of reagents and save investment, while still achieving the objective of generating goethite and improving the sedimentation filtration performance of solids.

In accordance with a typical embodiment of the present disclosure, a method for removing iron in an iron-containing solution in hydrometallurgy is provided. This method comprises the steps of: adding an iron-containing solution in hydrometallurgy into a reactor through a first homogenizing distributor, controlling concentration of the ferric iron in the reactor below 1 g/L, controlling pH of the solution in the reactor to be 2.5~4, the temperature to be 65~100° C., and the reaction duration to be 1~3 hours, performing solid-liquid separation for the solution after reaction, and removing the iron in the iron-containing solution in hydrometallurgy in the form of goethite.

The reaction formula is as follows:

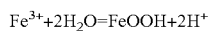

$$Fe^{3+}+2H_2O=FeOOH+2H^+$$

In the technical solution of the present disclosure, adding the iron-containing solution in hydrometallurgy into the reactor through a homogenizing distributor can directly convert the ferric iron in the solution to goethite precipitation, without a need to conduct ferric iron-ferrous iron-ferric iron conversion by adding lots of reducing agents and oxidizers as it does in the prior art, and without a need to return the seed crystal, which saves operation costs; in this method, solid-liquid separation is easy for the precipitation, the underflow concentration of the thickener can reach above 35%, which reduces entrainment of valuable metals in the underflow ore pulp, and improves the recovery rate of valuable metals except iron.

Preferably, controlling pH of the solution in the reactor to be 2.5~4 is achieved by adding neutralizer to the reactor through a second homogenizing distributor, because the homogenizing distributor enables the neutralizer to be added to the reactor evenly and slowly, which improves the stability of the reaction system in the reactor, and facilities the smooth progress of the production. Preferably, a plurality of reactors are provided, automatic-flow connection exists between the plurality of reactors, and the reaction duration can be controlled to be 1~3 hours.

According to a typical embodiment of the present disclosure, the neutralizer is one or more selected from a group consisting of limestone, lime, magnesium oxide, zinc oxide and sodium hydroxide. In actual operation, the neutralizer is usually added in the form of slurry, but sodium hydroxide is exceptional, sodium hydroxide is soluble, and is usually added in the form of a solution of a certain concentration.

Preferably, the first homogenizing distributor is a uniform dispersing device. This enables the iron-containing solution in hydrometallurgy to be added to the reactor evenly and slowly, which is favorable for controlling the concentration of the ferric iron in the solution anywhere in the reactor to be below 1 g/L, and unevenness due to too intensive addition will not occur. More preferably, the reactor is a reactor with stirring function, which is favorable for maintaining the evenness of the solution in the reactor.

In accordance with a typical embodiment in the present disclosure, when the iron-containing solution in hydrometallurgy contains ferrous iron, oxidant is introduced to the reactor to oxidize it to ferric iron; when the iron-containing solution in hydrometallurgy does not contain ferrous iron, it is unnecessary to introduce oxidant to the reactor. The reason is that when the iron-containing solution in hydrometallurgy contains partial ferrous iron, oxidant such as air or oxygen is introduced to oxidize the ferrous iron in the iron-containing solution in hydrometallurgy to ferric iron, which is removed at the same time of the ferric iron being removed, and thus the iron removal rate will reach 90~98%.

In accordance with a typical embodiment of the present disclosure, a device for removing iron in an iron-containing solution in hydrometallurgy is provided. The device comprises: a first homogenizing distributor for adding the iron-containing solution in hydrometallurgy into the reactor; a reactor for reacting the iron in the iron-containing solution in hydrometallurgy to generate goethite; and a thickener for removing the goethite generated in the reactor through solid liquid separation.

In the technical solution of the present disclosure, adding the iron-containing solution in hydrometallurgy into the reactor through a homogenizing distributor can directly convert the ferric iron in the solution to goethite precipitation, without a need to conduct ferric iron-ferrous iron-ferric iron conversion by adding lots of reducing agents and oxidizers as it does in the prior art, and without a need to return the seed crystal, which saves operation costs; in this method, solid-liquid separation is easy for the precipitation, the underflow concentration of the thickener can reach above 35%, which reduces entrainment of valuable metals in the underflow ore pulp, and improves the recovery rate of valuable metals except iron.

Preferably, a second homogenizing distributor is further comprised for adding neutralizer to the reactor, because the homogenizing distributor enables the neutralizer to be added to the reactor evenly and slowly, which improves the stability of the reaction system in the reactor, and facilities the smooth progress of the production. Preferably, a plurality of reactors are provided, automatic-flow connection exists between the plurality of reactors, and the reaction duration can be controlled to be 1~3 hours.

Preferably, the first homogenizing distributor is a uniform dispersing device. This enables the iron-containing solution in hydrometallurgy to be added to the reactor evenly and slowly, which is favorable for controlling the concentration of the ferric iron in the solution anywhere in the reactor to be below 1 g/L, and unevenness due to too intensive addition will not occur. More preferably, the reactor is a reactor with stirring function, which is favorable for maintaining the evenness of the solution in the reactor.

According to a typical embodiment of the present disclosure, as shown in FIG. 1, a solution 2 containing ferric iron at a temperature of 65~100° C. is added to a group of reactors with stirring function, and the group of reactors usually comprising more than two reactors, which are a first reactor 10 and a second reactor 20 in this embodiment, through a first homogenizing distributor 11. Automatic-flow connection exists between the first reactor 10 and the second reactor 20, at the same time a neutralizer 1 such as limestone, lime, magnesium oxide, zinc oxide, or sodium hydroxide is added to the first reactor 10 through a second homogenizing distributor 12, pH of the reactor is maintained between 2.5 and 4, and the reaction duration is 1~3 hours. When the solution 2 containing ferric iron does not contain ferrous iron, it is unnecessary to add oxidant during the process; when the solution 2 containing ferric iron contains partial ferrous iron, oxidant such as air or oxygen can be introduced to oxidize the ferrous iron to ferric iron, which is removed at the same time of the ferric iron being removed, and thus the iron removal rate can reach 90~98%. The ore pulp after reaction is directly sent to a thickener 30 for solid-liquid separation, wherein the underflow 4 of the thickener contains iron slag, underflow concentration of a conventional high-efficiency thickener is above 35%, and an overflow 3 is the solution after removing iron, which are sent to respective processes for treatment.

The beneficial effect of the present disclosure will be further described in conjunction with the embodiments.

Embodiment 1

A device shown in FIG. 1 is used, ferric iron in an iron-containing solution after pressure oxidation in a gold pressure pre-oxidation project is 15 g/L, concentration of the ferric iron in the reactor is controlled below 1 g/L, pH of the solution in the reactor is controlled to be 3~4, the temperature to be 70° C., and the sulfuric acid to be 10 g/L, four goethite iron removal tanks (reactor) are used, the reaction duration is 2 hours, concentration of the ferric iron in the solution after removing iron is about 0.07 g/L, the iron removal rate is about 99%, and the underflow concentration of the thickener is 40%.

Embodiment 2

A device shown in FIG. 1 is used, ferric iron in a copper-containing solution in a project is 11 g/L, concentration of the ferric iron in the reactor is controlled below 1 g/L, pH of the solution in the reactor is controlled to be 3~4, the temperature to be 80° C., and the sulfuric acid to be 5 g/L, 3 goethite iron removal tanks (reactor) are used, the reaction duration is 1.5 hours, concentration of the ferric iron in the solution after removing iron is about 0.05 g/L, the iron removal rate is about 99%, and the underflow concentration of the thickener is 36%.

Embodiment 3

A device shown in FIG. 1 is used, for a 6 g/L iron-containing solution in a lab, concentration of the ferric iron in the reactor is controlled below 1 g/L, pH of the solution in the reactor is controlled to be 3~4, the temperature to be 65° C., and the sulfuric acid to be 2 g/L, a goethite iron removal tank (reactor) is used, the reaction duration is 2.5 hours, concentration of the ferric iron in the solution after removing iron is about 0.3 g/L, the iron removal rate is about 95%, and the underflow concentration of the thickener after solid-liquid separation is 35%.

Embodiment 4

A device shown in FIG. 1 is used, for a 12 g/L iron-containing solution in a lab, concentration of the ferric iron in the reactor is controlled below 1 g/L, pH of the solution in the reactor is controlled to be 2.5~4, the temperature to be 100° C., and the sulfuric acid to be 2 g/L, a goethite iron removal tank (reactor) is used, the reaction duration is 1 hour, concentration of the ferric iron in the solution after removing iron is about 0.02 g/L, the iron removal rate is about 99%, and the underflow concentration of the thickener after solid-liquid separation is 45%.

As can be seen from the above description, the above embodiment in the present disclosure achieves the following technical effect: adding the iron-containing solution in hydrometallurgy into the reactor through a homogenizing distributor can directly convert the ferric iron in the solution to goethite precipitation, without a need to conduct ferric iron oxide-ferrous iron oxide-ferric iron oxide conversion by adding lots of reducing agents and oxidizers as it does in the prior art, and without a need to return the seed crystal, which saves operation costs; in this method, solid-liquid separation is easy for the precipitation, the underflow concentration of the thickener can reach above 35%, which reduces entrainment of valuable metals in the underflow ore pulp, and improves the recovery rate of valuable metals except iron.

The above are only the preferred embodiments of the present disclosure and not intended to limit the present disclosure. For those skilled in the art, various modifications and changes can be made to the present disclosure. Any modification, equivalent substitution and improvement made within the spirit and principle of the present disclosure are intended to be included within the scope of protection of the present disclosure.

What is claimed is:

1. A method for removing iron in an iron-containing solution in hydrometallurgy, comprising steps of: adding the iron-containing solution in hydrometallurgy into a reactor through a first homogenizing distributor, controlling concentration of ferric iron in the reactor below 1 g/L, controlling pH of the solution in the reactor to be 2.5~4, temperature to be 65~100° C., and reaction duration to be 1~3 hours, performing solid-liquid separation for the solution after reaction, and removing iron in the iron-containing solution in hydrometallurgy in a form of goethite; wherein controlling pH of the solution in the reactor to be 2.5 to 4 is achieved by adding neutralizer to the reactor through a second homogenizing distributor; wherein the first homogenizing distributor is a uniform dispersing device; wherein when the iron-containing solution in hydrometallurgy contains ferrous iron, oxidant is added to the reactor to oxidize ferrous iron to ferric iron; when the iron-containing solution in hydrometallurgy does not contain ferrous iron, it is unnecessary to add oxidant to the reactor; the reactor is a reactor with stirring function.

2. The method according to claim 1, wherein the neutralizer is one or more selected from a group consisting of limestone, lime, magnesium oxide, zinc oxide and sodium hydroxide.

3. The method according to claim 1, wherein the oxidant is air or oxygen.

4. The method according to claim 1, wherein a plurality of reactors are provided, and automatic-flow connection exists between the plurality of reactors.

* * * * *